Aug. 3, 1948.  A. A. NELSON  2,446,298
SOFT CUSHION LININGS FOR ARTIFICIAL
DENTURES AND PROCESS
Filed Sept. 29, 1945
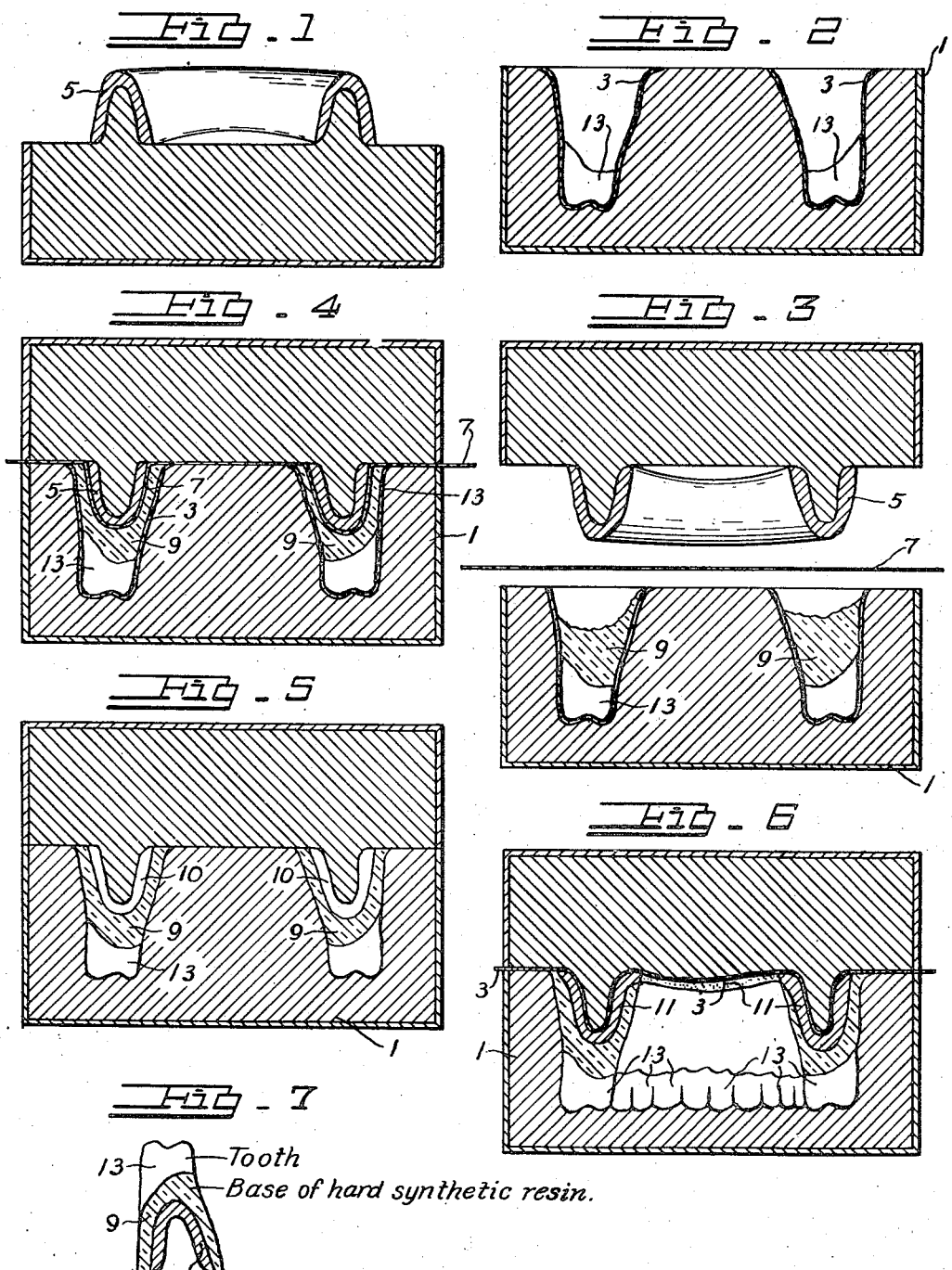
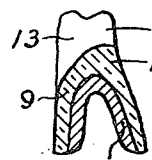
13 — Tooth
— Base of hard synthetic resin.
9
11 — Soft cushion lining of
vinyl chloracetate, or vinyl chloride, or
vinylidene chloride, or vinyl chloride vinylidene
chloride plasticized and held in suspension
with butyl phthalyl butyl glycollate.
INVENTOR
ALEX A. NELSON
BY
F.D.Hicks
ATTORNEY Patented Aug. 3, 1948

2,446,298

UNITED STATES PATENT OFFICE 2,446,298

SOFT CUSHION LINING FOR ARTIFICIAL DENTURES AND PROCESS

Alex A. Nelson, Pleasant Ridge, Mich.

Application September 29, 1945, Serial No. 619,421

1 Claim. (Cl. 32—2)

This invention relates to making a soft cushion lining for artificial dentures, and more particularly to the attachment of the lining to the denture base material, and pertains both to the process and the product.

A brief history of the prior art endeavors to solve such problems may facilitate understanding the advantages of my invention. Soft cushion linings for artificial dentures are an old art. In the early 1900's vellum soft rubber was used as a medium to attain this purpose when constructing vulcanite or hard rubber dentures. The question of attaching offered no problem here because materials of like nature, and practically identical composition, were used, except that one had incorporated into it a flexibilizing agent which prevented it from becoming a hard mass during the curing process which all rubber, or vulcanite compounds, must undergo. Theoretically this soft vellum rubber lining should not get hard but in actual practice and in use in the mouth, it hardened and became approximately as rigid as the base vulcanite from which the rest of the denture was constructed. The material, likewise, became extremely foul in the mouth through the absorption of the mouth secretions and mucous liquid food. These linings became so foul that usually within a period of a week, it was with extreme reluctance that anyone came within close proximity of the patient.

Attempts were made to make latex rubber "overshoes" which were removable and which the patient could remove and cleanse in boiling water to sterilize. These "overshoes" shrunk the inevitable 30 to 40 per cent in a very short period of time so they would no longer fit the base of the denture, and had to be abandoned as was the vellum rubber mentioned in preceding paragraph.

This invention has as an object to provide an improved process which does away with the objections of the preceding two described methods of applying soft linings to artificial dentures. Since 1926 vulcanite rubber has gone into a steady decline as a base for the construction of artificial dentures. This was due to the advent of superior esthetic synthetic resins suitable for the purpose. Phenol-formaldehyde resins were used for a period of approximately ten years and then a more suitable resin, and one which apparently seems ideal, made its advent into the dental field. I refer to methyl-methacrylate resins. These resins are far superior to any material the dental profession has had to work with for the construction of dentures. This material however is a rather difficult one to unite with other materials of a synthetic origin. In other words methyl-methacrylate does not lend itself to chemical union with other materials.

With the advent of this material, attempts were made to make soft linings by introducing, into methyl methacrylate resin, plasticizers which would make it flexible or by treating it with some of the other resins of the methacrylate or acrylate group, either in the monomer or polymer form. This was similar to the flexibilizing agents used in rubber to make them suitable for lining purposes in artificial dentures. Strange as it may seem, the same conditions as arose in the vellum rubber, arose with these plasticized acrylic linings. They became foul; they became hard and they "cold flowed" and distorted out of shape; although their union chemically was as good as the vellum rubber.

This invention also has as an object to provide an improved product and process which obviates these difficulties and is accomplished by the use of an elastomeric material, specifically a material of dissimilar nature from methyl methacrylate but however derived from the same family group, i. e. vinyl alcohol. The material is made from the well known "V. Y. N. U." resin, a product of Carbide and Carbon Chemical Corporation (Bakelite Division) which, in more specific chemical terms, is a vinyl chloracetate plasticized and held in suspension with butyl phthalyl butyl glycollate, heat and light stabilizers and the proper coloring material. Said material is brought to a putty-like consistency, practically non-tacky, by a suitable heat treatment. For this purpose the material is heated for a time, depending upon the quantity or mass of the material and the degree of temperature applied, until the material has a putty-like non-tacky consistency throughout. The temperature applied may be from 110 to 150 degrees Fahrenheit. I have found that I can use a combination of plasticizers for this purpose, such as dioctyl phthalate one part, butyl phthalyl butyl glycollate one part and dibutyl phthalate one part. Other combinations of plasticizers are possible such as the sebacates, and give varying properties to the material, but the butyl phthalyl butyl glycollate is necessary in these mixtures to secure proper chemical adhesion of the soft lining to the hard methyl methacrylate.

Dental apparatus of a conventional type, suitable for performing my process, is shown in Figs. 1 through 6, inclusive. These are cross-sectional views across between the first and the second molars and in Fig. 6 sufficient of the material in the lower flask has been removed to show the inside of the forward portion of the finished product. Fig. 7 is a cross-sectional view taken through one side of the finished product to show it separately from the manufacturing apparatus.

For the construction of these linings the denture is prepared as usual for the construction of a regular hard methyl methacrylate denture, by the use of conventional dental apparatus. It is flasked as usual in the lower half of a dental flask 1. It is then tinfoiled with foil 3. The upper half of the flask is placed in position and poured with artificial stone (dental), in a well known manner. The cover is applied. After "boiling out" and being cleansed of all wax, the mold is packed with the prepared hard methyl methacrylate, as usual. A sheet of base plate wax 5 is placed, as shown in Fig. 1, over the model side of the mold, it is adapted and trimmed to size and position, chilled and with this wax acting as a shim, it is placed in position over the lower half of the flask, as shown in Fig. 3, with two sheets of wet Cellophane 7 interposed between it and the denture material 9. The flask is closed for a test pack, as shown in Fig. 4. The flask is separated again and it will be seen that the wax shim has made a place for itself by expressing out the denture material. The excess denture material is removed and all flash removed. Waste gates or traps are cut in the matrix walls of the mold, the wax shims and the Cellophane 7 are removed from the model, leaving a space 10, which may be seen in Fig. 5, the model is coated with tinfoil and then in accordance with my invention, this plasticized vinyl resin 11 that has been brought to the putty-like consistency, as described previously, is applied to the denture material in excess. The tinfoiled model section is placed in position, and the flask closed, bolted together or placed in flask press or suitable device to keep it in position. It is then placed in a dental vulcanizer with the proper amount of water in said vulcanizer. The heat is applied and the temperature brought to 290 degrees Fahrenheit, internal temperature as ascertained by a thermometer suspended in a well in the interior of the vulcanizer (as is common procedure in the dental and allied professions). The temperature is maintained for twenty minutes after it reaches this temperature. Then the steam is blown off, the case removed from the vulcanizer, then allowed to bench cool ten to fifteen minutes, then cooled in cold water for a half hour and the case removed from the flask in the manner common to denture construction. It is then trimmed down and polished in the usual manner for artificial dentures and in order to secure a glossy surface to the soft lining, ethyl acetate is applied to a coarse towel and vigorously rubbed on the soft lining, keeping away from the hard methacrylate as much as possible. The finished product is shown in Figs. 6 and 7. The teeth 13 may be any commonly available artificial teeth made of plastic, porcelain or other material.

Such a lining made in accordance with my invention does not pick up the secretions of the mouth nor mucous food, nor does it become stiff. Since it does not pick up the fluids of the mouth, it does not become foul.

It is to be understood that it is possible to make linings not only from vinyl chloracetate resin, held in suspension in a plasticizer, such resins being designated as "plastisols," but resins of this type can also be made from vinyl chloride and also from vinylidene chloride; accordingly, I want it understood that this invention is not to be limited to the vinyl chloracetate resin of proper molecular weight known as V. Y. N. U., and that its scope includes the vinyl chloride and vinylidene chloride of proper molecular weight usable as "plastisol type" resins and from which this lining may be made. It is my belief, however, that butyl phthalyl butyl glycollate is necessary in the plasticizers to cause complete chemical union with the hard methacrylate. Also the possibility exists, when suitable means of construction are available, of using vinyl chloracetate hard material or hard vinyl chloride material as a denture base, to which my linings may be attached.

My process may also be utilized for providing a soft cushion lining and attaching it to a hard plastic denture already made, in which application it is necessary to remove sufficient of the old hard base material to permit a sufficient bulk of material to be added without raising the bite. Then a quantity of fresh prepared hard methacrylate material is applied sufficient to cover the whole removed area. A shim may be applied to express out excess material. Then the soft cushion lining is made and attached, as previously described.

It is apparent that within the scope of my invention variations may be made other than herein disclosed, the invention comprehending variations thereof.

I claim:

An artificial denture having in combination, a base denture of hard methyl methacrylate, and a soft cushion lining of a vinyl chloracetate, plasticized and held in suspension with dioctylphthalate, butylphthalylbutyl-glycollate and dibutylphthalate, adherent to said base denture.

ALEX A. NELSON.

REFERENCES CITED

The following references are of record in the file of this patent:

UNITED STATES PATENTS

| Number | Name | Date |
|---|---|---|
| 88,682 | Twitchell | Apr. 6, 1869 |
| 390,950 | Daly | Oct. 9, 1888 |
| 2,013,295 | Tidd | Sept. 3, 1935 |
| 2,101,431 | Groff | Dec. 7, 1937 |
| 2,367,767 | Gale | Jan. 23, 1945 |

FOREIGN PATENTS

| Number | Country | Date |
|---|---|---|
| 157,688 | Austria | Jan. 10, 1940 |
| 558,470 | Great Britain | Jan. 6, 1944 |

OTHER REFERENCES

Table 3, Properties of commercial plasticizers, on page 27 of "Vinylite Copolymer Resins for Surface Coatings," published in 1942 by Carbide and Carbon Chemical Corporation, New York city.